United States Patent [19]

Tsushima

[11] Patent Number: 5,039,461

[45] Date of Patent: Aug. 13, 1991

[54] PROCESS FOR MAKING BALLOON

[75] Inventor: Kyogo Tsushima, Ryugasaki, Japan

[73] Assignee: Okamoto Industries Inc., Tokyo, Japan

[21] Appl. No.: 411,699

[22] Filed: Sep. 25, 1989

[30] Foreign Application Priority Data

Oct. 21, 1988 [JP] Japan ............................. 63-266809

[51] Int. Cl.$^5$ ...................... B29C 41/14; B29C 35/08
[52] U.S. Cl. .................................. 264/22; 204/157.63; 264/301; 264/307; 264/304; 427/36; 427/42
[58] Field of Search ................... 264/22, 315, 301, 25, 264/306, 307, 304; 425/174.4, 174.2; 156/272.2, 275.5; 204/157.63, 157.89; 427/35, 36, 42; 252/500

[56] References Cited

U.S. PATENT DOCUMENTS

| | | |
|---|---|---|
| 2,188,736 | 1/1940 | Jordan . |
| 4,107,013 | 8/1978 | McGinniss et al. ................ 524/524 |
| 4,364,879 | 12/1982 | Gut et al. ............................. 264/22 |
| 4,803,020 | 2/1989 | Valaitis et al. ...................... 264/22 |
| 4,910,233 | 3/1990 | Bell et al. ............................ 264/22 |

FOREIGN PATENT DOCUMENTS

| | | |
|---|---|---|
| 0101012 | 2/1984 | European Pat. Off. . |
| 01441326 | 6/1985 | European Pat. Off. . |
| 2931793 | 2/1981 | Fed. Rep. of Germany ........ 264/22 |
| 55-124637 | 9/1980 | Japan ................................. 264/315 |
| 56-51345 | 5/1981 | Japan ................................... 264/22 |
| 56-69118 | 6/1981 | Japan ................................... 264/22 |
| 59-184629 | 10/1984 | Japan ................................... 264/22 |
| 8303188 | 9/1983 | PCT Int'l Appl. . |
| 853926 | 11/1960 | United Kingdom ................ 264/22 |

Primary Examiner—Jeffery Thurlow
Assistant Examiner—Mathieu Vargot
Attorney, Agent, or Firm—Darby & Darby

[57] ABSTRACT

This invention relates more particularly to a process for making a balloon to be used with an endoscope in which, according to the present invention, the balloon is processed of a basic material solution including a natural rubber latex or synthetic rubber latex to which is added a sensitizer to radiation cross-linking so as to act and accelerate its cross-linking effect by irradiating ionizing radiations such as gamma ($\gamma$) rays utilizing a Co-60 source upon the rubber latex mixed with the sensitizer to radiation cross-linking, which is characterized in that such the balloon can be provided without any vulcanizing process as in the conventional, process. Nevertheless the balloon is still given various excellent properties such as transparency, inflatability, tensile strength with a high elasticity in which these properties have uncomparative advantage against any conventional type balloon which had problems caused by in its inferior transparency caused by addition of vulcanizing agent and the like into the basic latex, or increased thickness of the balloon's thin film with lower content of vulcanizing agent in order to secure the transparency and prevent inferior tensile strength due to the lower content of vulcanizing agent.

11 Claims, No Drawings

PROCESS FOR MAKING BALLOON

BACKGROUND OF THE INVENTION

This invention relates to a process for making a balloon to be used as an attachment on the end of an endoscope used medically for observing, diagnosing and curing diseased parts of blood vessels or other internal tubular organs of human bodies, or which is used on the end of catheter for encasing the endoscope thereby protecting it from any disease polluted blood.

Conventionally, as disclosed in Japanese patent application No. sho 61-259595, a conventional process for making a balloon was disclosed in that a dipping former was dipped into a basic material (main raw material) comprising: a desired amount of colloidal sulfur type vulcanizing agent and the like; a zinc oxide type activator and the like; a dithiocarbamate type vulcanization accelerator; and a paraffin emulsion type anti-oxidant and the like, wherein a balloon shape film adhered around the forming mold was heated in vulcanizing oven.

The endoscope was generally used by inserting it into the blood vessel or internal organ for observing and diagnosing the above interiors by lighting a light-guide equipped on the end of endoscope, and then used for curing the diseased part by an effective surgery such as irradiation of Nd-YAG laser, argon (Ar) laser and the like. In the circumstances, in order to use the balloon for the above purposes, it was naturally required to provide a balloon having a good transparency.

In the above conventional process for making the balloon, however, a problem was that the conventional process had a trend to inferior transparency due to the use of admixtures such as vulcanizing agent and the like as mentioned in the above, therefore, it had to reduce the used amount of admixture if it was wished to improve the transparency. This was a contradiction because to reduce the amount of admixture was to reduce the tensile strength of film, therefore, it was compromised to maintain both transparency and tensile strength by thickening the thickness of film containing a amount of admixtures. However, an important purpose of the use of balloon in endoscope surgery, was to stop blood flow within a blood vessel by inflating the balloon to block up the passage closely. In this purpose, the conventional type balloon did not meet the above purpose and requirements.

SUMMARY OF THE INVENTION

The present invention, accordingly, has been provided in view of the aforementioned disadvantages of the prior art. An object of the present invention resides in that it is to provide a process for making a balloon having excellent transparency and inflatability with high grade tensile strength without any addition of admixture such as the vulcanizing agent and the like.

The technical means achieved in the present invention is that, as an admixture, a sensitizer to radiation cross-linking is added to a natural rubber latex or synthetic rubber latex for composing a main raw material, wherein by irradiating with an ionizing radiation upon the main raw material, cross-linking has been accelerated within the main raw material caused by the sensitizer admixed previously. Upon completion of the main raw material processed under the ionizing radiation, thereafter as an well known process, a former is dipped into the above main raw material to form a film adhered around the former, the film is dried only for solidification of the film without any vulcanization such as a vulcanizing oven in the conventional process. The dried and solidified thin film is then stripped from the former, wherein the balloon of the present invention has been formed with the inflatable portion incorporated with the fixing portion of balloon.

The foregoing object is accomplished in one embodiment by providing the foregoing technical means in that, according to the present invention in contrast to the conventional process, without of the admixtures used conventionally of colloidal sulfur type vulcanizing agent and the like and zinc oxide type activator and the like, a sensitizer to radiation cross-linking is mixed into natural rubber latex or synthetic rubber latex thereon, the above mixture is irradiated to accelerate the radiation cross-linking wherein a main raw material is composed, after that, a former is dipped into the radiation cross-linked main raw material to form a balloon with a thin film which is dried to solidify the balloon formed with an inflatable portion on the end of the fixing portion and having an excellent transparency, inflatability and tensile strength.

DESCRIPTION OF THE PREFERRED EMBODIMENT

Explaining now in detail as to a practical example as follows:

Referring now firstly to an outline of the processing stage of the present invention and one example of its conditions, each stage of the processing of the balloon are shown as one after another as follows:

(1) Preparing of the former;

(2) Dipping the former into coagulant solution. The purpose of the coagulant is to produce a greater deposit, thickness than is achieved by 'straight' latex dipping.

(3) Dipping the former into the main material;

(4) Drying of the latex film on the former. (at 80° C. for 20 minute);

(5) Stripping the film having a balloon shape from the former;

(6) Leaching the balloon to a dilute alkaline solution (composing of ammonia, sodium hydroxide, potassium hydroxide and the like) so as to extract the coagulant solution and the others.

(7) Treating to prevent the adhesion of film surface; and (8) Drying (at 80° C. for 60 minute).

EMBODIMENT OF SUBSTANTIAL PRACTICE

The latex used consists as follows:

(a) Natural rubber latex (rubber contents): 100 parts latex solid (b) 1, 3 - butylene glycol diacrylate: 5 parts (c) 2, 2'- methylene - bis - (4 - methyl 6 - tert - butylphenol): 1 parts In the above case, however, the mixing of these compositions (b) and (c) into the latex (a) are not performed at same time but separated into two stages, that is, firstly the composition (b) is mixed into the latex (a) with one hour agitation so as to make a latex, wherein the latex (a) is irradiated at 5 Mrad (mega rad) with gamma ($\gamma$) - rays from Co 60 (cobalt 60 source) so as to compose the main material, thereafter the composition (c) is added to the main material produced by gamma ($\gamma$) - rays irradiation.

By using the main material composed in the above, the formation the balloon is specifically performed in accordance with the forming stages of aforementioned dipping formation method, wherein the balloon comprises a cylindrical shaped fixing portion having 0.16 mm of the film thickness and 1.94 mm of its inside diameter and a globular shaped inflatable portion having 0.16 mm of the film thickness and 1.81 mm of its inside diameter, these parts being incorporated with each other through a compressed part therebetween which has 0.22 mm of film thickness and 1.54 mm of inside diameter, in addition, the globular shaped inflatable portion if specified to provide 0.19 mm of the film thickness at the top surface of the same portion. Thereafter, the balloon is stripped from the former and dipped into the dilute alkaline solution (composed of ammonia sodium hydroxide, potassium hydroxide and the like) so as to extract the coagulant and then it is treated by an antitack and dried at 80° C. for 60 minute finally, whereby the thin film shaped balloon has been obtained with an excellent transparency.

Referring now in detail to the main material, the main material is composed of the rubber latex as the main ingredient and the latex is made by adding the sensitizer to exhibit high cross-linking efficiency by irradiation.

As to the properties of rubber latex, it uses a natural rubber latex consisting of a polyisoprene as its main ingredient or a synthetic rubber latex, wherein these latexes are used as single or suitably combined form. In addition, it may be possible to combine additives such as a rubber softener, a stabilizer, an anti-oxidant, a filler, a reinforcer, a pigment and the like, into the rubber latex as necessary.

As an anti-oxidant, it is possible to use an ordinary type anti-oxidant in the art. A suitable amount of the anti-oxidant is between 0.5 parts and 2 0 parts in the measure of ratio. If this anti-oxidant is added to the latex before the irradiation of the ionizing radiation, it is found that the anti-oxidant is degraded due to the irradiation with gamma ($\gamma$) - rays, and it then loses its basic effect as an anti-oxidant. From this fact, the addition of such the anti-oxidant has to be performed after an irradiation.

The sensitizer on radiation cross-linking has an effect to accelerate the cross-linking when the component of rubber latex is formed with the cross-linking by irradiating with ionizing radiation, which effectively reduces the radiation dose.

Thus, by adding such sensitizer for radiation cross-linking into the aforementioned solution with the main component from the rubber latex, the latex mix is composed.

As to the specification of the sensitizer, it can be the following kind of polyfunctional monomers which contain two polymerizable unsaturated C=C bonds in a molecule such as: 1,3 - butylene glycol diacrylate; 1,3 - butylene glycol dimethacrylate; 1,6 - hexanediol dimethacrylate; 1,6 - hexanediol diacrylate; neopentyl glycol diacrylate; neopentyl glycol dimethacrylate and the like; or monofunctional monomers which contain one polymerizable unsaturated C=C bond in a molecule such as ethylacrylate; n - butylacrylate; n - hexyl acrylate; 2 - ethylhexyl acrylate and the like.

These sensitizers are added to the latex from 1 to 20 parts and preferably 2 to 10 parts respectively into. 100 parts latex solid.

As to the ionizing radiations, they are $\alpha$-rays, $\beta$-rays, $\gamma$-rays, X-rays, electron beam and the like. Among these radiations $\gamma$-rays, electron beam and X-rays are more practical than the others in this industrial field.

As to the nuclides of the radio isotope used in the above, though they are not limited particularly Co-60 source is practical in this industrial field.

It is not necessary to limit the radiation dose of the ionizing radiation, but it is practical to use it between 0.5 and 10 Mrad (méga rad) and preferably between 1.0 and 8 Mrad.

Into the main material prepared from the latex irradiated the above ionizing with the former is dipped, wherein a desirable thin film balloon becomes to be formed.

The former is used for obtaining a balloon having a desirable size and shape. After stripping the balloon from the former, an elastic and inflatable portion is provided incorporated with the end of its fixing portion which has an open section at one end and has a mostly cylindrical shape having around 0.90 to 17.00 mm of inside diameter, which is visible from the inside the inflatable portion, wherein it can form a globular body or an inflatably projected body or a cylindrical body which is possible to inflate the transparent inflatable portion with a predetermined size by means of injecting the isotonic sodium chloride solution into the inflatable portion through a so-called channel or air and water injecting ports in which is provided within the endoscope.

In addition, relating to the diameter of the inflatable portion, it is an option as to whether the diameter is formed larger than the fixing portion or smaller than it or same, furtherly it may be allowed to provide a smaller diameter portion compressed between the inflatable portion and the fixing portion, or a ring having convex shaped reinforcing rows being provided with the same body.

In addition, it is also an option to select the inside diameter of the inflatable portion in the range from around 0.80 to 35.00 mm in response to the place to diagnose or perform surgery. In any event the inflatable portion should be formed so as to be inflated and then made more thin by the injection of isotonic sodium chloride solution, and allow the transmission of a laser beam.

From the standpoint of preventing environmental pollution when used balloons are scrapped after usage in surgeries, which are burned up as usual due to their polluted natures from diseased blood, the following combustion tests have been conducted by analyzing the combustion gases from balloons. Table A shows the results of combustion analysis of the sulfur vulcanization balloons and the radiation cross-linking balloons. Table B shows the physical property of film (500% modulus).

TABLE A

| Items | sulfur vulcanization type | radiation cross-linking type |
|---|---|---|
| SOx | 20 mg/g | less than 2.0 mg/g |
| NOx | 4.3 mg/g | 2.4 mg/g |
| Hydrogen cyanide | 0.015–0.025 mg/g | 0.002 mg/g |
| Carbon monoxide | 300 mg/g | 56 mg/g |
| Ashes | 2.2% | 0.5% |
| Zinc content | 10,000 ppm | 77.2 ppm |
| oxygen index* | 16.8 | 15.8 |

*oxygen index: necessary concentration of oxygen to be able to burn smokelessly.

TABLE B

| Item | sulfur vulcanization type | radiation cross-linking type |
| --- | --- | --- |
| 500% modulus* | 37–38 kgf/cm² | 27 kgf/cm² |

*500% modulus: Modulus of elasticity at 500%.

It will be apparent that the invention, as described above, achieves a balloon having excellent properties of transparency, inflatability and tensile strength owing to the process for making which involves directing an ionizing radiation at a latex mix consisting of natural rubber latex or synthetic rubber latex to which has been added a sensitizer for radiation cross-linking which increases the cross-linking effect of the ionizing radiations in the latex mix wherein a main material has been composed thereof, a former is dipped into the main material for forming the balloon thereto, the balloon is dried after stripping the balloon from the former.

Accordingly, the process can provide a useful balloon having a high inflatability to make easier medical observation and diagnosis as well as to improve the transmissivity of a laser beam. Consequently the balloon can display a sufficient function of endoscope, to which is performable securely to the diagnosis, curing and the like.

As shown in Table B, this balloon, which has been made according to the present invention, has a rich inflatability with a lower modulus which means having a rich elasticity in the surgery field. The balloon can be inflated to a desired size by injecting an isotonic sodium chloride solution so that it can contact with the interior of a blood vessel closely to stop the blood flow, as well as it making easier curing of a diseased part within the blood vessels and the like by irradiating with a laser beam and the like.

In addition, according to this process for making the balloon, it does not require any vulcanizing agent such as colloidal sulfur and any activator such as zinc oxide, as well as any silicone emulsifying treatment, wherein it can make a balloon having an excellent transparency. Besides, in comparison with the drying times during the process for making between the conventional type balloon and the present invention, conventionally it required at least 60 minutes at 80° C. in the main drying process, in contrast to the process of the present invention merely requiring 20 minutes the drying time, thus saving the processing time effectively.

In addition, relating to the waste disposal of used balloons from the surgery field, conventionally it was impossible to treat them by burning in an incinerator due to their contents of various noxious gases produced such as sulfur oxide (SOx), nitrogen oxide (NOx), hydrogen cyanide, carbon monoxide and the like which were used in the vulcanization, which were deemed as one of the source of air pollution.

In contrast to the above, the balloon made according to the present invention can be burned after use because of an extremely lower contents of noxious gases when they are burned out in the incinerator, which is more hygienic, as well as it is much advantageous in that it can reduce the ashes as its waste disposal after burning out because of no contents of an activator such as a zinc oxide. As a result it can prevent damage to the ceramic filters in the incinerator caused by soot or ash when the balloons are burned out.

The invention may be embodied in other specific forms without departing from the spirit or essential characteristics thereof. The present embodiment is therefore to be considered in all respects as descriptive and not restrictive of, the scope of the invention being indicated by the appended claims rather than by the foregoing description and all changes which come within the meaning and range of equivalency of the claims are therefore intended to be embraced therein.

What is claimed is:

1. A process for making a balloon comprising the steps of:
   (a) providing a member selected from the group consisting of a natural rubber latex and a synthetic rubber latex as a basic material;
   (b) providing an amount of a monofunctional monomer containing one polymerizable unsaturated C=C bond sensitizer to radiation cross-linking for adding into said basic material to compose a mixture with said basic material;
   (c) adding said sensitizer into said basic material;
   (d) irradiating said mixture with an ionizing radiation selected from the group consisting of alpha-rays, beta-rays, gamma-rays, X-rays, and electron beams for exciting said cross-linking action catalyzingly supported by said sensitizer within a composition of said mixture, wherein a main raw material is composed; and
   (e) forming said balloon having a shape with an inflatable portion incorporated with the end of its fixing portion, which is processed by dipping a former into said main raw material so as to form said shape made of a thin film adhered around said former thereon, drying said thin film together with said former for solidying said film after drawn up from said main raw material solution thereby, stripping said solidified film from said former, whereby said balloon is obtained.

2. A process for making a balloon for an endoscope comprising the steps of:
   (a) providing a latex selected from the group consisting of natural and synthetic latexes;
   (b) adding to said latex a monofunctional monomer containing one polymerizable unsaturated C=C bond sensitizer to radiation cross-linking to provide a mixture;
   (c) irradiating said mixture with ionizing radiation selected from the group consisting of alpha-rays, beta-rays, gamma-rays, X-rays, and electron beams to provide a cross-linked mixture;
   (d) dipping into said cross-linked mixture a former having the shape of the balloon to be formed;
   (e) removing said former with a think film of cross-linked latex from said mixture;
   (f) solidifying said thin film by drying; and
   (g) stripping said solidified film from said former to obtain said balloon.

3. The process of claim 2 comprising the additional steps of:
   (a) leaching said balloon in a dilute alkaline solution;
   (b) treating said balloon to prevent adhesion; and
   (c) again drying said balloon.

4. The process of claim 3 wherein the alkaline material is selected from the group consisting of ammonia, sodium hydroxide, and potassium hydroxide.

5. The process of claim 2 wherein an anti-oxidant is added to the mixture following cross-linking, but before dipping of said former.

6. The process of claim 5 wherein the amount of antioxidant is from 0.5 part to 2.0 parts per 100 parts of the latex.

7. The process of claim 2 wherein the amount of sensitizer is from 1 to 20 parts per 100 parts of latex.

8. The process of claim 7 wherein the amount of sensitizer is from 2 to 10 parts per 100 parts of latex.

9. The process of claim 2 wherein the amount of radiation employed is from 0.5 to 10 megarads.

10. The process of claim 9 wherein the amount of radiation is from 1.0 to 8 megarads.

11. The process of claim 2 wherein the latex is formed from polyisoprene.

* * * * *